Figure 1:
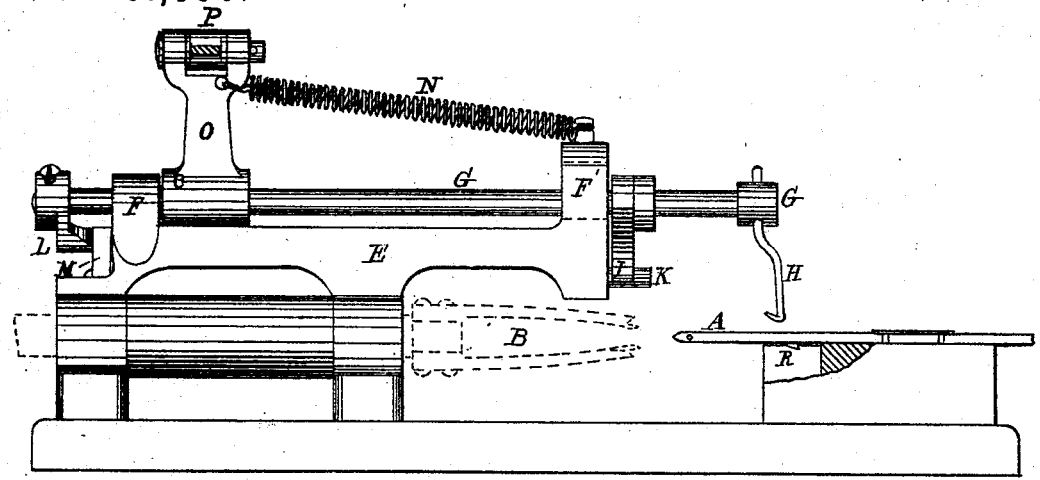

J. ASHWORTH.
Machines for Making Weavers' Harness.

No. 151,950.  Patented June 16, 1874.

Witnesses
S. A. Wood
Wm. C. Hibbard

Inventor
John Ashworth

UNITED STATES PATENT OFFICE.

JOHN ASHWORTH, OF FALL RIVER, ASSIGNOR TO THOMAS A. EMMONS, OF LAWRENCE, AND JOHN F. NICHOLS, OF FALL RIVER, MASSACHUSETTS.

IMPROVEMENT IN MACHINES FOR MAKING WEAVERS' HARNESS.

Specification forming part of Letters Patent No. 151,950, dated June 16, 1874; application filed March 20, 1874.

*To all whom it may concern:*

Be it known that I, JOHN ASHWORTH, of Fall River, in the county of Bristol and State of Massachusetts, have invented certain Improvements in Machines for Making Weavers' Harness, of which the following is a specification:

This invention relates to certain devices which are intended to be applied to machines for making weavers' harness, such, for instance, as the machine known in this country as the Bowlas machine, and that known as the Sladdin and Lord machine, both of which machines make what is known in the trade as the English harness, in which two twines are used to make the two sides of the harness, and the eye is formed from one of the twines by being looped upon itself and around the other twine, and secured by a half-hitch. In such machines the eye of the harness is formed around a bar called the needle or eye bar, which determines the size of the eye, and its position in relation to the two sides of the leaf, and through which needle the twines are supplied, from which the several healds are made in succession by the aid of other parts of the mechanism, which are not directly affected by my improvements.

The purpose of my improvements is more especially to aid in closing the eye, as it is formed in one of the twines, around the needle or eye bar, to determine its size accurately, and to retain the eye so formed in its proper position upon the needle, and to prevent it from being distorted by the draft of the twines in making the next succeeding heald.

My first improvement consists in the use of a vibrating hook, or other equivalent device, in combination with the other parts of the mechanism which form the heald, by which the twine from which the eye is formed is caught near the eye, and drawn partially around the needle to close up the knot or hitch, and which then releases the twine at the proper time to enable the heald to be completed.

My second improvement consists in forming upon the needle or eye bar a small barb, beyond which the incomplete eyes are pushed in succession as they are formed by the mechanism, which serves to prevent the eye from being drawn toward the point of the needle by the draft of the twines. The peculiar operation of each of these parts will be more fully seen by their description.

In the drawings only a few parts of the harness-machine are represented, sufficient to show the application of my improvements to it.

Figure 2:
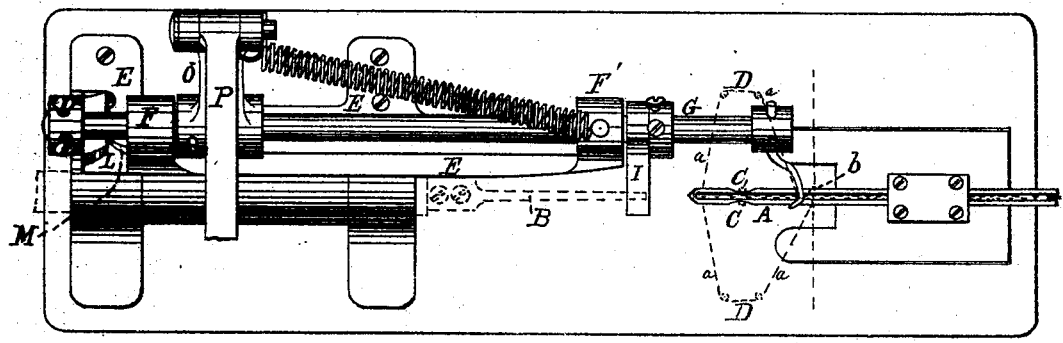
Figures 3, 4:
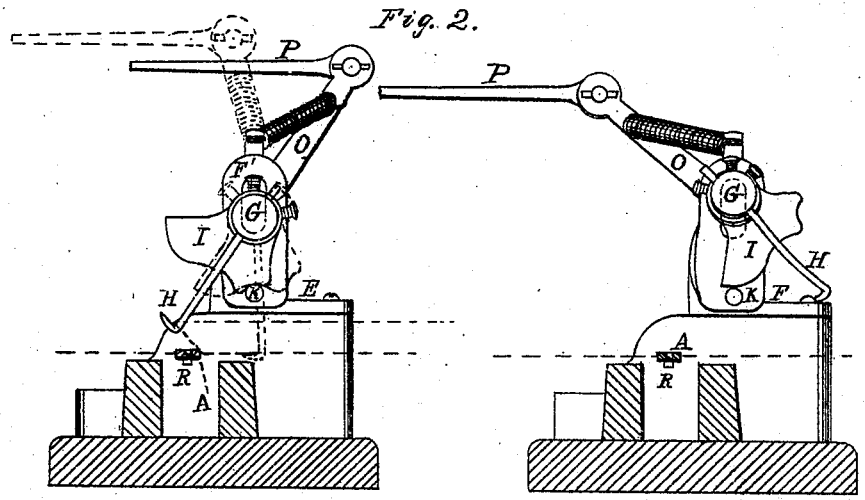

Figure 1 is a side elevation. Fig. 2 is a plan. Fig. 3 is a transverse sectional elevation, showing in full lines the hook in action with the twine in its most forward position, and in dotted lines shows the hook in its lowest position below the twine. Fig. 4 is a similar elevation, showing the hook in its backward position and limit of movement, and out of engagement with the twine.

A is a portion of the point of the long needle or eye bar, through which the cords are led, as shown, to form the healds, and are shown by the dotted lines. B shows in dotted lines the pusher drawn back, by which the rudimentary eye already formed on the looper-fingers (not shown) is pushed forward onto the free end of the needle. C C show the ends of the opening-fingers, by which the cords are opened out from the sides of the needle. D D show the positions of the forked points of the arms, which open out the loops of the cords, and carry them to the back bands, to which they are knitted by two separate threads.

The drawing, Fig. 2, shows by the dotted lines *a a* the loops partly drawn out, and *b* shows the position of the heald last made. These parts thus described are merely intended to represent the positions that they occupy in the machine, omitting the details of mechanism, and are intended only to show how my improvements are applied to them.

E is a bracket or stand, of the form shown, which carries the machinery of my first improvement. It is attached to the frame of the machine in the position shown relative to the other parts, and carries the standards F F', in which bearings are made for the rocking shaft G. The bearing F is circular, but the bearing F' is a vertical slot, in which this end of the shaft G can rise and fall. H is a hook, of the form shown, which is inserted radially in the inner end of the shaft G, and the bill of the hook is carried back and forth between the two positions (shown in full lines in Figs. 3 and 4) by the oscillation of the shaft. I is a cam, which is attached to the shaft G, of the contour shown in Figs. 3 and 4, which rests upon the pin K, which is fixed in the bracket E, and, as the shaft oscillates, imparts to it and the hook which it carries a peculiar rising and falling motion due to such a form of the face of the cam. L is a cam, attached to the outer end of the shaft G, which has a radial face, and works against the contact-surface M upon the bracket E, and imparts a longitudinal movement to the shaft G during its oscillation. The cam L is kept against the contact-surface M by the spring N, which draws the shaft constantly in that direction. The shaft G is oscillated by the arm O upon it, and the connecting-rod P, which receives the proper reciprocating motion from a cam upon one of the shafts in the machine, which carry the binding-threads, by which the healds are knit to the back bands; or it may be driven in any other manner that will oscillate the shaft at the proper time and the proper distance.

From this construction it will be seen that, by the oscillation of the shaft G back and forth, the bill of the hook H will receive a peculiar motion by reason of the action of the cams I and L acting in concert with the oscillation. The cam I raises and lowers that end of the shaft with the hook as the shaft oscillates, and the cam L and spring N move it endwise. By this peculiar movement of the hook it leaves the position shown in Fig. 4, and swings downward till it reaches the position shown by the dotted lines in Fig. 3, when the bill of the hook passes under the twine engaging with it, and by the forms of the two cams I and L the hook is raised with the twine and carried diagonally over the needle, and outward toward its point to the position shown in Figs. 1, 2, and 3. The heddle-eye is thus formed upon this twine around the needle, and is held by a half-knot at that side of the needle, as shown, and as the knot in that position renders freely, the eye is by the hook drawn tight around the needle, and held so firmly that the draft of the other twine, which is simply looped through the eye, will not draw the eye away from the needle upon that side, and make the eye too large. The backward movement of the hook is so timed, in conjunction with the drawing out of the heald, that the hook will leave the twine in a horizontal position at about the time that the drawing out of the heald is finished, which leaves the knot close to the side of the needle, and all the eyes of exactly the same size. R is a small barb, which is attached to the under side of the needle, beyond which the newly-formed eye is pushed by the pusher B, and is prevented by it from being drawn toward the point of the needle by the diagonal draft of the twines in forming the next heald.

It is obvious that the requisite motions of the hook could be imparted by other devices; but the arrangement shown is one that I have tried with full success, and is well adapted to be used with the said harness-machines as now made.

By these modifications of the mechanism the operation of the machine is much improved, and the forked device which embraces the needle, and is called the "retainer," which has been heretofore used in said machines, is dispensed with, with the mechanism for operating the same.

What I claim is—

1. The device H, constructed and operating substantially as described.

2. The needle provided with the barb, constructed and operating substantially as described.

Executed March 16, 1874.

JOHN ASHWORTH.

Witnesses:
S. A. WOOD,
WM. C. HIBBARD.